United States Patent
Suresh et al.

(10) Patent No.: US 11,055,458 B1
(45) Date of Patent: Jul. 6, 2021

(54) FUNCTIONAL COVERAGE OF DESIGNS USING TRANSITION BINS AND CROSS COVERAGE

(71) Applicant: Xilinx, Inc., San Jose, CA (US)

(72) Inventors: Aparna Suresh, Moolapalayam Erode (IN); Tapodyuti Mandal, Hyderabad (IN); Vinayak Thonda, Mehdipatnam Hyderabad (IN)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/899,092

(22) Filed: Jun. 11, 2020

(51) Int. Cl.
*G06F 30/00* (2020.01)
*G06F 30/3308* (2020.01)
*G01R 31/3183* (2006.01)
*G06F 117/08* (2020.01)

(52) U.S. Cl.
CPC ... *G06F 30/3308* (2020.01); *G01R 31/31835* (2013.01); *G06F 2117/08* (2020.01)

(58) Field of Classification Search
CPC ............. G06F 30/3308; G06F 2117/08; G01R 31/31835
See application file for complete search history.

(56) References Cited

U.S. PATENT DOCUMENTS

| | | | | |
|---|---|---|---|---|
| 4,326,101 A | * | 4/1982 | Sakoe | G10L 15/12 704/238 |
| 5,680,332 A | * | 10/1997 | Raimi | G06F 30/3323 703/13 |
| 6,427,223 B1 | * | 7/2002 | Kim | G06F 30/33 324/762.02 |
| 6,675,138 B1 | * | 1/2004 | Hollander | G01R 31/31707 703/13 |
| 7,523,434 B1 | | 4/2009 | Taylor | |
| 7,640,526 B1 | | 12/2009 | Blodget | |
| 8,402,409 B1 | | 3/2013 | Janneck | |
| 8,495,680 B2 | * | 7/2013 | Bentolila | H04N 7/17309 725/46 |
| 9,083,740 B1 | * | 7/2015 | Ma | H04L 63/0227 |
| 9,355,206 B2 | * | 5/2016 | Ikram | G06F 30/30 |
| 10,831,961 B2 | * | 11/2020 | Dutta | G06F 30/398 |
| 10,853,226 B2 | * | 12/2020 | Edwards | G06F 11/3684 |

(Continued)

OTHER PUBLICATIONS

Eslami, F. et al., "Enabling Effective FPGA Debug using Overlays: Opportunities and Challenges," In 2nd Int'l. Workshop on Overlay Architectures for FPGAs (OLAF2016), Feb. 21, 2016, 6 pg.

(Continued)

*Primary Examiner* — Naum Levin
(74) *Attorney, Agent, or Firm* — Kevin T. Cuenot

(57) ABSTRACT

Verification for a design can include, for a covergroup corresponding to a variable of the design, generating a state coverage data structure specifying a plurality of transition bins. Each transition bin can include a sequence. Each sequence can specify states of the variable to be traversed in order during simulation of the design. Verification can include generating a state sequence table configured to use state values as keys and one or more of the sequences as data for the respective keys, and during simulation of the design, maintaining a sequence list specifying each sequence that is running based on sample values of the variable. Hit counts for the transition bins can be updated during the simulation.

20 Claims, 15 Drawing Sheets

(56) References Cited

U.S. PATENT DOCUMENTS

2011/0025376 A1    2/2011  Grittke
2020/0393798 A1*  12/2020  Kushibe .............. G06N 7/08

OTHER PUBLICATIONS

Haenel, V., "2.8. Interfacing with C," [online] Scipy Lecture Notes [retrieved Aug. 11, 2017] retrieved from the Internet: <http://www.scipy-lectures.org/advanced/interfacing_with_c/interfacing_with_c.html>, 31 pg.

Catanzaro, B. et al., "SEJITS: Getting Productivity and Performance with Selective Embedded JIT Specialization," Programming Models for Emerging Architectures, vol. 1, No. 1, Oct. 2009, pp. 1-9.

Capalija, D. et al., "Tile-based Bottom-up Compilatoin of Custom Mesh-of-Functional-Units FPGA Overlays," In IEEE 24th Int'l. Conf. on Field Programmable Logic and Applications (FPL), Sep. 2, 2014, pp. 1-8.

"Very high-level programming language," [online] Wikipedia, the free encyclopedia, Jun. 25, 2017, retrieved from the Internet: <https://en.wikipedia.org/w/index.php?title=Very_high-level_programming_language&oldid=787427362>, 2 pg.

"Amazon EC2 F1 Instances," [online] Amazon Web Services, Inc. © 2017 [retrieved Aug. 11, 2017], retrieved from the Internet: <https://aws.amazon.com/ec2/instance-types/f1/>, 14 pg.

Xilinx, Peter Alfke, "Created Uses of Block RAM", WP335 (v1.0), Jun. 4, 2008.

Maxfield, M., "Tutorial: Linear Feedback Shift Registers (LFSRs)—Part 1," [online] EE Times © 2018 UBM Electronics, An AspenCore company, Dec. 20, 2006 [retrieved Mar. 13, 2018], retrieved from the Internet: <https://www.eetimes.com/document.asp?doc_id=1274550>, 5 pg.

Lysaght, P. et al., "Runtime Adaptive Generator Circuit," U.S. Appl. No. 15/850,659, filed Dec. 21, 2017, 69 pg.

"From Regular Expression to NFA to DFA ," [online] SNS Courseware, Compiler design—RE&DFA&NFA, [retrieved Oct. 20, 2017], retrieved from the Internet: <https://tajseer.files.wordpress.com/2014/06/re-nfa-dfa.pdf>, 9 pg.

"Regular Expression to NFA (Non-Deterministic Finite Automata)," [online] HackingOff,com © 2012 [retrieved Mar. 20, 2018], retrieved from the Internet: <http://hackingoff.com/compilers/regular-expression-to-nfa-dfa>, 1 pg.

"Convert simple regular expressions to deterministic finite automaton Regex => NFA => DFA," [online] CyberZHG's Toolbox [retreived Mar. 20, 2018], retrieved from the Internet: <https://cyberzhg.github.io/toolbox/nfa2dfa>, 2 pg.

"Deterministic finite automaton," [online] Wikipedia, the free encyclopedia, Nov. 29, 2017, retrieved from the Internet: <https://en.wikipedia.org/wiki/Deterministic_finite_automaton>, 6 pg.

Nakahara, H. et al., "A regular expression matching circuit based on a decomposed automaton," In International Symposium on Applied Reconfigurable Computing, Mar. 23, 2011, pp. 16-28.

"Non-Deterministic finite automaton," [online] Wikipedia, the free encyclopedia, Mar. 3, 2018, retrieved from the Internet: <https://en.wikipedia.org/wiki/Nondeterministic_finite_automaton>, 8 pg.

Yamagaki, N. et al., "High-speed regular expression matching engine using multi-character NFA," In IEEE International Conference on Field Programmable Logic and Applications, FPL 2008, Sep. 8, 2008, pp. 131-136.

* cited by examiner

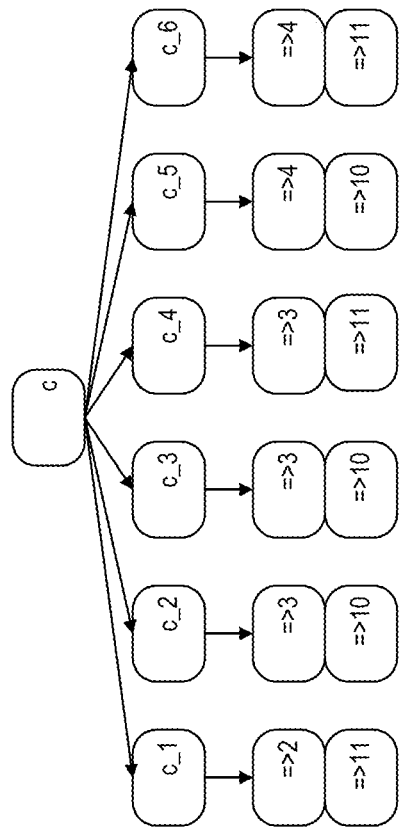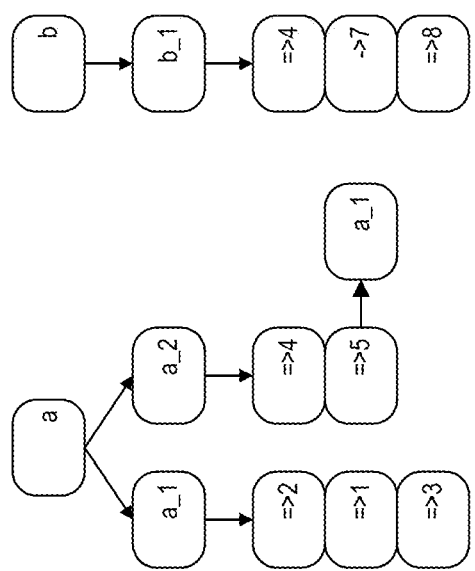
FIG. 3

602

| Bin Hit Counts | |
|---|---|
| a | 0 |
| b | 0 |
| c_1 | 0 |
| c_2 | 0 |
| c_3 | 0 |
| c_4 | 0 |
| c_5 | 0 |
| c_6 | 0 |

404

| List of Running Sequences |
|---|
| Empty |

604

| Next Expected Value |
|---|
| Empty |

— Sample Value → | 1 |

| Bin Hit Counts | |
|---|---|
| a | 0 |
| b | 0 |
| c_1 | 0 |
| c_2 | 0 |
| c_3 | 0 |
| c_4 | 0 |
| c_5 | 0 |
| c_6 | 0 |

404

| | List of Running Sequences |
|---|---|
| New | a_2_child_1 |
| New | b_2_child_1 |
| New | c_5_child_1 |
| New | c_6_child_1 |

604

| Next Expected Value |
|---|
| 5 |
| 7 or any value |
| 10 |
| 11 |

— Sample Value → 1 | 4 |

| Bin Hit Counts | |
|---|---|
| a | 0 |
| b | 0 |
| c_1 | 0 |
| c_2 | 0 |
| c_3 | 0 |
| c_4 | 0 |
| c_5 | 1 |
| c_6 | 0 |

404

| List of Running Sequences |
|---|
| b_1_child_1 |
| a_1_child_1 (Discard) |
| c_1_child_1 (Discard) |
| c_2_child_1 (Discard) |

604

| Next Expected Value |
|---|
| 8 |
| 1 |
| 10 |
| 11 |

—Sample Value→ 1  4  10  2  [7]

| Bin Hit Counts | |
|---|---|
| a | 0 |
| b | 1 |
| c_1 | 0 |
| c_2 | 0 |
| c_3 | 0 |
| c_4 | 0 |
| c_5 | 0 |
| c_6 | 0 |

404

| List of Running Sequences |
|---|
| b_1_child_1 |

604

| Next Expected Value |
|---|
| 8 |

—Sample Value→ 1  4  10  2  7  [8]

For a covergroup corresponding to a variable in a design, generate a hierarchical data structure specifying a plurality of transition bins, wherein each transition bin includes a sequence, and wherein each sequence specifies states of the variable to be traversed in order during simulation of the design
1202

Generate a state sequence table configured to use state values as keys and one or more of the sequences as data for the respective keys
1204

During simulation of the design, maintain a sequence list specifying each sequence that is running based on sampled values of the variable
1206

Update hit counts for the transition bins during the simulation
1208

FIG. 12

| Time | a Hit Index | b Hit Index | c Hit Index | Internal Cross axb Hit Index | Internal Cross axb Hit Index |
|---|---|---|---|---|---|
| 1 | 0 | 0 | 0 | (0 x 3) + 0 = 0 | (0 x 3) + 0 = 0 |
| 2 | 2 | 1 | 1 | (2 x 3) + 1 = 7 | (7 x 3) + 1 = 22 |
| 3 | 3 | 2 | 2 | (3 x 3) + 2 = 11 | (11 x 3) + 2 = 35 |

2000

For a covergroup having a coverpoint and a cross coverpoint for a design, generate a static coverage data structure
2002

Generate a hit index data structure for the cross coverpoint as a one dimensional array during the simulation
2004

Maintain the hit index data structure for the cross coverpoint during the simulation
2006

FIG. 20

FUNCTIONAL COVERAGE OF DESIGNS USING TRANSITION BINS AND CROSS COVERAGE

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to integrated circuits (ICs) and, more particularly, to simulation and verification of a design for an IC for performing functional coverage.

BACKGROUND

Functional coverage refers to a user-defined metric used to determine how much of a design for an integrated circuit has been tested. The design may be specified in a hardware description language such as System Verilog. In general, functional coverage involves creating a test plan specifying different verification objectives for the design. During a process such as simulation, functional coverage may be used to indicate how much of the design has been tested based on the test plan. For example, functional coverage may be calculated based on how many of the verification objectives of the test plan were met during the simulation. Often, functional coverage is expressed as a percentage of the verification objectives that were met during simulation.

SUMMARY

In one aspect, a method can include, for a covergroup corresponding to a variable in a design, generating a state coverage data structure specifying a plurality of transition bins, wherein each transition bin includes a sequence, and wherein each sequence specifies states of the variable to be traversed in order during simulation of the design. The method can include generating a state sequence table configured to use state values as keys and one or more of the sequences as data for the respective keys and, during simulation of the design, maintaining a sequence list specifying each sequence that is running based on sample values of the variable. The method also can include updating hit counts for the transition bins during the simulation.

In another aspect, a system includes a processor configured to initiate operations. The operations can include, for a covergroup corresponding to a variable, generating a state coverage data structure specifying a plurality of transition bins, wherein each transition bin includes a sequence, and wherein each sequence specifies states of the variable to be traversed in order during simulation of a design including the variable. The operations can include generating a state sequence table configured to use state values as keys and one or more of the sequences as data for the respective keys and, during simulation of the design, maintaining a sequence list specifying each sequence that is running based on sample values of the variable. The operations can also include updating hit counts for the transition bins during the simulation.

In another aspect, a computer program product includes one or more computer readable storage media, and program instructions collectively stored on the one or more computer readable storage media. The program instructions are executable by computer hardware to initiate operations. The operations can include, for a covergroup corresponding to a variable, generating a state coverage data structure specifying a plurality of transition bins, wherein each transition bin includes a sequence, and wherein each sequence specifies states of the variable to be traversed in order during simulation of a design including the variable. The operations can include generating a state sequence table configured to use state values as keys and one or more of the sequences as data for the respective keys and, during simulation of the design, maintaining a sequence list specifying each sequence that is running based on sample values of the variable. The operations also can include updating hit counts for the transition bins during the simulation.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 3 illustrates an example of transition bins implemented within the static coverage data structure for a covergroup.

FIGS. 6, 7, 8, 9, 10, and 11 illustrate certain operative features of using transition bins according to the inventive arrangements described within this disclosure.

FIG. 12 illustrates an example method of using a Deterministic Finite Automata (DFA) technique with transition bins for performing functional coverage of a design during simulation.

FIG. 20 illustrates an example method of using a recursive technique for performing functional coverage of a design during simulation.

DETAILED DESCRIPTION

Figure 1:
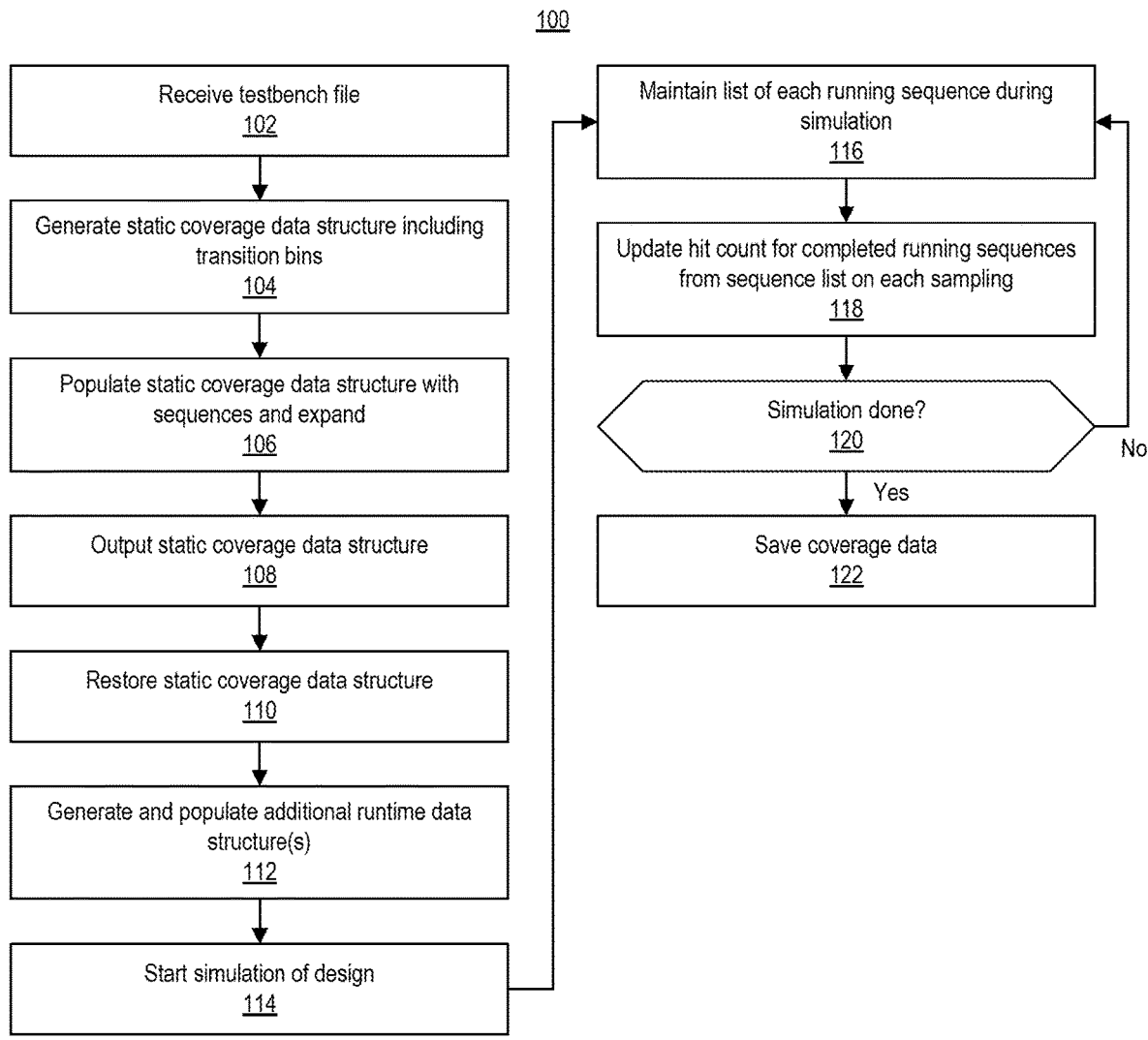
FIG. 1 illustrates an example method of implementing transition bins for performing functional coverage of a design.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to simulation and verification of a design for an IC using functional coverage. In accordance with the inventive arrangements described within this disclosure, example implementations of functional coverage features are described. A hardware description language (HDL) such as System Verilog specifies particular structures and/or techniques for performing functional coverage. For example, IEEE Standard for SystemVerilog—Unified Hardware Design, Specification, and Verification Language, IEEE Std. 1800™-2017 sets forth a standard functional coverage features. The inventive arrangements described within this disclosure provide particular implementations of such features that are more computationally efficient than conventional techniques resulting in faster runtimes (e.g., faster simulations of designs for purposes of performing functional coverage of the design).

In one aspect, example transition bin implementations for performing functional coverage are provided. Transition bins are used to track transitions, whether simple or complex, between states defined for a variable or an expression of a design during simulation. By tracking these transitions, or state changes, the functionality of the design can be verified. The example implementations described herein are capable of tracking these transitions in a more computationally efficient manner than is the case with conventional transition bin implementations. Further, the example implementations described herein allow these transitions to be tracked using less memory (e.g., random access memory or "RAM") and with less complexity than is the case with conventional transition bin implementations. In consequence, simulation of a design for verification purposes using the example transition bin implementations described herein may be performed faster and with less memory (e.g., RAM) compared to other conventional transition bin implementation techniques that may be used.

In another aspect, example coverpoint (or cross coverpoint) implementations for performing functional coverage are provided. A coverpoint specifies an integral expression of a design that is to be monitored during simulation. Each coverpoint can include a set of bins defined with states of the expression to be monitored. Combinational cross states of two or more related variables or expressions can be created using cross coverpoints. Whereas transition bins store and/or track transitions, the bins for coverpoints and/or cross coverpoints store and/or track values. The example implementations described herein are capable of tracking an increased number of coverpoints and/or cross coverpoints without the typical increase in computational time and/or memory (e.g., RAM) use that is common with other conventional coverpoint and/or cross coverpoint implementation techniques.

The example implementations described within this disclosure may be used for purposes of implementing and/or simulating designs (e.g., circuit designs) specified in a hardware description language and intended for implementation within an integrated circuit (IC). The example implementations may be used for performing functional coverage of designs intended for implementation in any of a variety of different types of IC. For example, the inventive arrangements may be used to perform functional coverage of designs intended for implementation in programmable ICs (e.g., programmable logic devices such as field programmable gate arrays), in Application-Specific ICs, or in other types of ICs. The inventive arrangements are not intended to be restricted to the particular type of IC for which the design is intended.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Using an HDL such as SystemVerilog, a "coverage group" (referred to herein as a "covergroup") may be defined that encapsulates a specification of a coverage model. Each covergroup encapsulation of the specification of the coverage model (or portion thereof) may include components such as a clocking event that synchronizes the sampling of coverage points, a set of coverage points, cross coverage points, optional formal arguments, and coverage options. The covergroup construct is a user-defined type. The type definition is written once, and multiple instances of that type can be created in different contexts. Similar to a class in high level programming languages, once defined, a covergroup instance can be created via the new( ) operator. A covergroup can be defined in a package, a module, a program, an interface, a checker, or a class.

A coverage point (referred to herein as a "coverpoint") specifies a variable or expression that must be monitored during simulation. Each coverpoint includes a set of bins. In general, each bin is associated with, e.g., stores, sample values or value transitions of the covered variable or expression. For purposes of discussion, bins intended to capture transitions of a variable or expression from one state to another during simulation are referred to herein as "transition bins". A sampling event for a coverpoint is defined by a clocking event or a procedural trigger specified by the user using the sample( ) method of coverage. Covergroups are sensitive to sampling events. As such, the coverpoints of a covergroup and the user defined transition bins for the coverpoints are updated as and when sampling occurs. Evaluation of a coverpoint expression (and of the enabling condition for the coverpoint, if any) takes place in response to the coverpoint being sampled.

Example 1 is an HDL file specified in SystemVerilog that illustrates example syntax for defining a covergroup, a coverpoint, and transition bins.

---
Example 1
---
```
reg[7:0] dvar;
covergroup cg;
    cp1 : coverpoint dvar {
        bins a = (2=>1=>3), (4=>5[*2]);
        bins b = (4->7=>8);
        bins c[ ] = (2,4) => (10,11);
    }
endgroup
cg cg1 = new( );
initial begin
    dvar = 2; cg1.sample( );
    dvar = 6; cg1.sample( );
end
```
---

In Example 1, an 8 bit register dvar is defined along with a covergroup named cg. The covergroup cg has a coverpoint cp1 defined inside with the variable dvar to be monitored. Example 1 further defines three transition bins a, b, and c that observe and track the state changes that the variable dvar may undergo. A new instance of cg with the name cg1 can be created using the new method. The sampling events for the instance cg1 which update cp1 for the value of dvar=2 followed by dvar=6 are also shown.

Example 1 illustrates that transition bins are capable of defining a complex sequence of transitions that may occur between states. Bin a defines two sequences (2=>1=>3) and (4=>5[*2]). In the second sequence, the first state value is 4 which must be followed by two consecutive repetitions of the state value 5. The bin b has only one sequence (4→7=>8) which defines a non-consecutive transition from the state value 4 to the state value 7, followed by a consecutive transition to the state value 8. Bin c has an array operator "[ ]" along with a ranged list of values (2 to 4) and (10 to 11), which results in a total of six sequences.

When dvar undergoes state changes equal to any of these sequences, the sequence is considered to have been covered (e.g., occurred or detected during simulation). In this regard, each bin has a hit count associated with the bin. The hit count of the bin is incremented when one or more of the sequences is covered (e.g., found in the sampled data for the variable or expression during the simulation). The hit counts of the bins are used to calculate a coverage score for a coverpoint and covergroup. The coverage scores ultimately contribute toward the functional coverage of the design.

Table 1 illustrates example syntaxes that may be used to define sequences for transition bins.

TABLE 1

| Operator/ Keyword | Use | Example Bin Definition | Expanded Notation of Bin |
|---|---|---|---|
| => | Consecutive transition | bins a1 = (1 => 2)<br>bins a2 = (1 => 2), (3 => 4) | 1 => 2<br>1 => 2 or 3 => 4 |
| * | Repeat times | bins b1 = 2[*3]<br>bins b2 = (1 => 2[*3] => 6) | 2 => 2 => 2<br>1 => 2 => 2 => 2 => 6 |
| : | Repeat range | bins b3 = (1 => 2[3:5] => 6) | 1 => 2 => 2 => 2 => 6 or<br>1 => 2 => 2 => 2 => 2 => 6 or<br>1 => 2 => 2 => 2 => 2 => 2 => 6 |
| , | Range list | bins c2 = [2:4], 5 => 11, 12 | 1 => 3 or<br>1 => 4 or<br>2 => 3 or<br>2 => 4 |
| [:] | Range list | bins c2 = [2:4], 5 => 11, 12 | 2 => 11 or 2 => 12 or<br>3 => 11 or 3 => 12 or<br>4 => 11 or 4 => 12 or<br>5 => 11 or 5 => 12 |
| -> | Goto | bins d1 = (1 => 2[->1])<br>bins d2 = (1 => 2[->3:5] = 4 | 1 ... => 2 ( ... can be any number of intermediate states)<br>1 ... => 2 ... => 2 ... => 2 => 4 or<br>1 ... => 2 ... => 2 ... => 2 ... => 2 => 4 or<br>1 ... => 2 ... => 2 ... => 2 ... => 2 ... => 2 => 4 |
| = | Non-consecutive | bins e1 = (1 => 2[=1])<br>bins e2 = (1 => 2[=3:5] => 4 | 1 ... => 2<br>1 ... => 2 ... => 2 ... => 2 ... => 4 or<br>1 ... => 2 ... => 2 ... => ... => 2 ... => 4 or<br>1 ... => 2 ... => 2 ... => 2 ... => 2 ... => 2 ... => 4 |
| [ ] | Array of sequences | bins f2[ ] = (1 => 2), (3 => 4) | 1 => 2<br>3 => 4 (Each sequence has a separate hit count) |
| Illegal | — | Illegal bins g1 = (2 => 3 => 4), (5=>) | Raises a runtime error if this sequence occurs in sample values. |
| Ignore | — | Ignore bins h1 = (7 => 8), (3 => 4) | Any matching sequence will be ignored for coverage computation. |
| Default | — | bins i1 = default sequence | Any sequence of transition bins not included in the user defined transition bins will cause this bin to be hit. |

For a user-defined transition bin, "bins a=(1=>2[*3]=>5)" signifies that bin a should be marked as hit when the sample values follow the sequence {1, 2, 2, 2, 5}. This sequence of values can be a subset of the actual values sampled. This means that the example sample values set of {4, 1, 2, 2, 2, 5, 6} will also cause the hit count of bin a to be incremented. There also may be an overlap between sample values. The overlap may cause multiple increments of a hit count to occur for the same sequence. For example, for "bins b=(1=>2=>1)" and sample values {1, 2, 1, 2, 1, 2, 1}, the hit count of bin b should be 3 as opposed to 2.

FIG. 1 illustrates an example method 100 of implementing transition bins for performing functional coverage of a design. The operations described in connection with FIG. 1 may be performed by a computer system (system). An example of a system capable of performing the operations of FIG. 1 is described in connection with FIG. 21. In general, method 100 is performed in three different phases including elaboration, population, and runtime. Beginning in block 102, the system receives a testbench file. An example of a testbench file is the HDL file of Example 1. The testbench file may be specified in SystemVerilog and define one or more covergroups, one or more coverpoints, and transition bins.

Blocks 104-110 may be performed as part of the elaboration phase of method 100. In block 104, the system is capable of generating a static coverage data structure based on the testbench file. The static coverage data structure includes transition bins. As an example, the system is capable of generating a static coverage data structure that is hierarchical and includes a sub-portion for a covergroup defined in the testbench file. The covergroup corresponds to a variable in a design that is to undergo verification by way of simulation. The system creates a plurality of transition bins for the covergroup as part of the static coverage data structure.

In an example implementation, during elaboration, the system is capable of modeling a covergroup internally as a SystemVerilog class where each variable and/or instance of the covergroup is analogous to an object of the class. Example 2 illustrates an example model of a covergroup that may be used by the system.

Example 2

Class coveragegroup_cg;
   new( );
   population( );
   update( );
   vector<coverpoints>;
  endclass Referring to Example 2, each class representation of a covergroup has a constructor subprogram responsible for initializing the object (e.g., an instance of the covergroup class) and an update subprogram that updates hit counts of the transition bins defined in a coverpoint upon sampling during simulation.

In block 106, the system is capable of populating the static coverage data structure with sequences and expanding each of the sequences. The system can include a sequence, e.g., one sequence, from the testbench file within each transition bin. Example sequences are illustrated in Example 1 and are also shown in the column named "Example Bin Definitions" of Table 1. An example sequence from Table 1 is "2[*3]." Each sequence specifies, for the variable to be monitored, an ordered set of states to be traversed during simulation of the design. The system is also capable of expanding each sequence into a list of all possible sequences. For example, within a transition bin having the sequence "2[*3]", the system expands the sequence to a list of all possible sequences as "2=>2=>2". Each sequence of a transition bin, e.g., as illustrated in the column of Table 1 "Example Bin Definitions", is expanded to a list of all possible sequences, e.g., as illustrated in the column of Table 1 named "Expanded Notation of Bins".

In block 108, the system is capable of outputting the resulting static coverage data structure. For example, the system is capable of outputting the populated and expanded static coverage data structure as a binary file. The resulting static coverage data structure may be stored in a non-volatile memory of the system. In an example implementation, the system is capable of outputting the resulting static coverage data structure as a C++ database.

Blocks 110-112 may be performed as part of the population phase of method 100. In block 110, the system is capable of loading the static coverage data structure from non-volatile memory into runtime memory (e.g., volatile memory or RAM). In block 112, the system is capable of generating and populating one or more runtime data structures. For example, the system is capable of generating a state sequence table and populating the state sequence table. In populating the state sequence table, the system uses state values as keys for the state sequence table and uses one or more of the sequences as the data in the state sequence table for the respective keys. The system may also generate a list for tracking running sequences during simulation (e.g., where the list is initially empty).

Blocks 114-122 may be performed as part of the runtime phase of method 100. In block 114, the system is capable of starting simulation of the design. In block 116, the system is capable of maintaining the list of each running sequence during simulation. For example, during the simulation, the system is capable of sampling update event data (e.g., sampling events corresponding to the update subprogram and based on the sampling functions) and updating the data, which may be stored in a Deterministic Finite Automata (DFA).

A DFA refers to a finite state machine that is capable of performing pattern matching and lexical analysis. In the example implementations described herein, the DFA may be implemented by a computer executing instructions and using one or more data structures. In operation, the DFA is capable of producing a unique computation for each received input string of symbols and accepting or rejecting the input string.

In block 118, the system is capable of updating a hit count for running sequences from the sequence list that complete during the simulation. The system is capable of performing block 118 for each sampling that is performed. For example, in response to determining that a particular sequence has completed, e.g., reached the "done" or "end" state, the system increments the hit count for that sequence. In block 120, a determination is made as to whether the simulation is done. In response to determining that the simulation is not done, method 100 loops back to block 116 to continue. In response to determining that the simulation is done, method 100 proceeds to block 122. In block 122, the system stores the coverage data that is generated as part of the static coverage data structure. The coverage data, e.g., the hit counts, may be stored in non-volatile memory.

Figure 2:
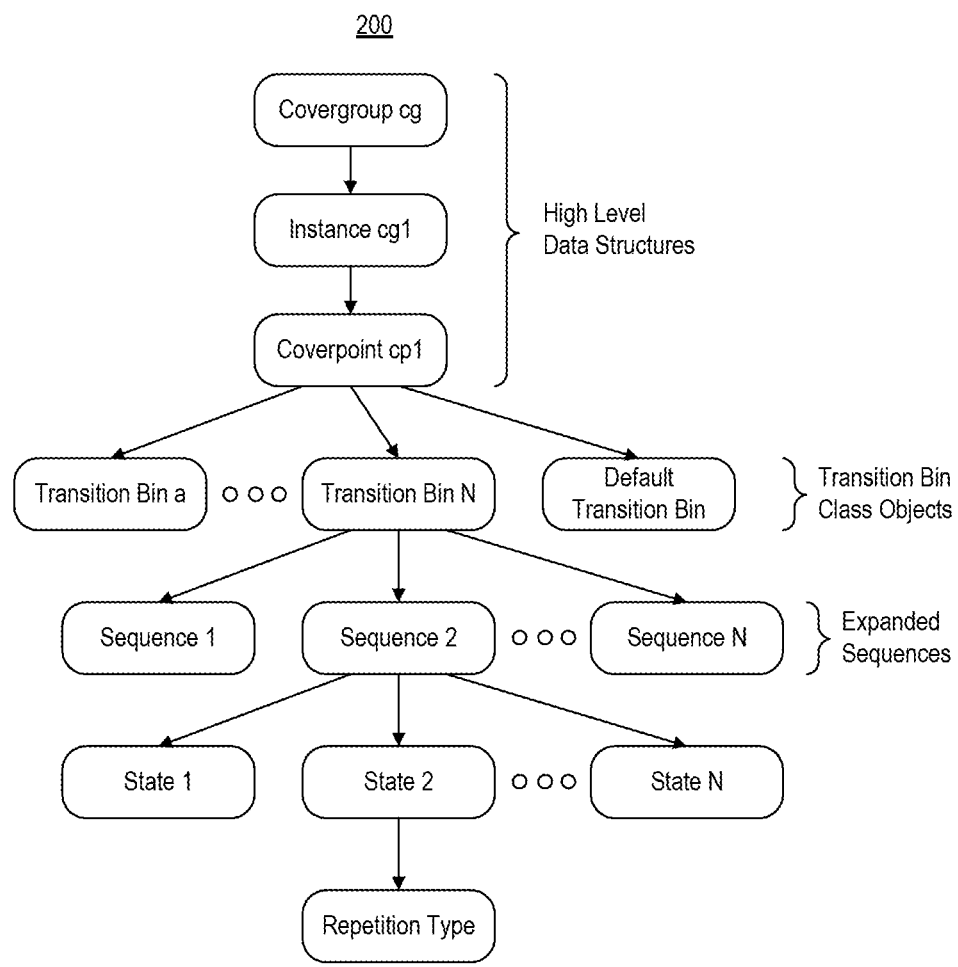
FIG. 2 illustrates an example of a static coverage data structure.

FIG. 2 illustrates an example of a static coverage data structure (data structure) 200. Data structure 200 is an example data structure generated for a covergroup during the elaboration phase. During the elaboration phase, the transition bins of the testbench are parsed and populated into data structure 200. For example, for a given covergroup, an instance of the covergroup (e.g., cg1) is created. Beneath the covergroup instance, a coverpoint (e.g., cp1) is created. Beneath the coverpoint, a transition bin class object may be created for each bin defined in the testbench for the coverpoint. A default bin class object may also be created for any sequence of transitions not included in the user defined transition bins.

Each transition bin class object holds a vector of sequences. In each transition bin class object, the expanded sequences may also be stored. Each sequence has a vector of states that are expected to be traversed. Beneath each sequence, the states for the sequence are stored. The states (e.g., state objects) have information about the value stored therein and the type of transition (consecutive/non-consecutive/goto/repeat/ranged repeat). The state objects may also specify a repetition type. The repetition type is capable of storing a lower and/or an upper bound for the repetition and the number of times the current state has been repeated. For example, the repetition type may specify the number of times a value must repeatedly occur during sampling before advancing to the next state.

FIG. 3 illustrates an example of transition bins implemented within the static coverage data structure for a covergroup. More particularly, FIG. 3 illustrates an example of the transition bins implemented for the covergroup cg1 of Example 1 and shows an example of the data stored as part of the resulting static coverage data structure as a result of completing the elaboration phase. For purposes of illustration, the population of transition bin a during elaboration is described. It should be appreciated that similar operations may be performed to populate each other transition bin except for the default transition bin.

During the elaboration phase, for the user defined bin "a=(2=>1=>3), (4=>5[*2])", the system is capable of performing operations such as creating two sequences corresponding to "a_1" and "a_2". The system populates sequence a_1 with a vector of states having the state values 2, 1, and 3 specified in order. The system populates sequence a_2 with a vector of states having the state values of 4 and 5[*2] also specified in order. The last state, 5[*2] in sequence a_2 also stores the number of times the value 5 must be repeated.

Each transition bin class object may also include a hit count array. The hit count array may be implemented as a dynamically allocated integer array. The size of the hit count array is decided after expanding all sequences defined for the bin. During the elaboration phase, the hit count array is NULL. The memory allocation and initialization for the hit count arrays take place during runtime.

Figures 4, 5:
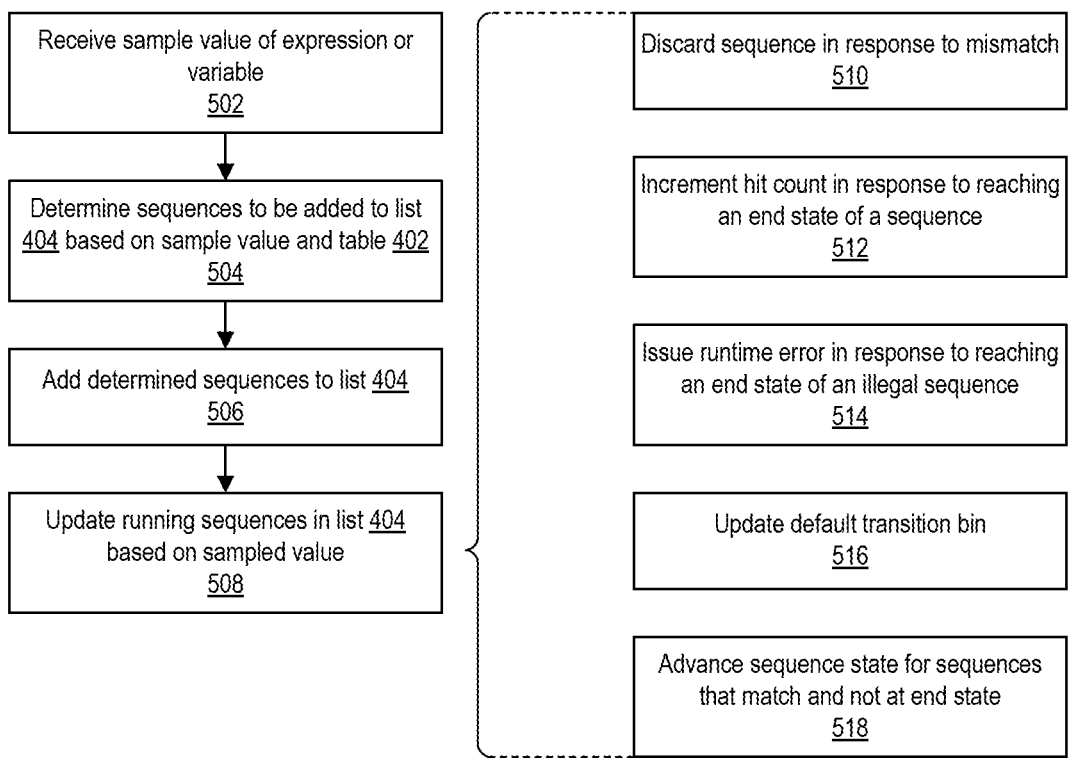
FIG. 4 illustrates example runtime data structures generated during the population phase.
FIG. 5 is a flow chart illustrating an example method of operation for computing functional coverage for a design.

FIG. 4 illustrates example runtime data structures generated during the population phase. During the population phase, the system is capable of loading the static coverage data created during the elaboration phase and also generating a state sequence table (table) 402 and a list of running sequences (list) 404. Table 402 and list 404 are used during simulation for querying and updating the static coverage data including, for example, hit counts.

Table 402 is populated with the starting state value for each of the sequences of the bins. For example, referring to Example 1, the first value in each sequence of bins a, b, and c is 2, 4, or 3. Thus, the system populates the key values (which are unique within the key column) with the values 2, 4, and 3. The system populates the data in each row with the particular sequence(s) that start with the state value from the key column. For example, sequence a_1, c_1, and c_2, in reference to FIG. 3, each start with the state value of 2 and are populated into the row with the key of 2. Sequences a_2, b_1, c_5, and c_6 each start with the state value of 4 and are populated into the row with the key of 4. Sequences c_3 and c_4 each start with the state value of 3 and are populated into the row with the key of 3.

Once the system populates table 402, the system compares any user defined illegal or ignore sequence(s) with each entry in table 402. The system is capable of setting flags corresponding full/partial matching sequences as illegal or ignore. For purposes of illustration, consider an example with bin b1: {1→2→3→4; 1→2; 3→4; } and illegal bin b2: {2,3}. Bin b1 has 3 sequences b1_1{1→2→3→4}, b1_2{1→2}, b1_3{3→4}. Bin b2 has one sequence b2{2→3}. Since bin b2 is specified as illegal and b1_1 is a super set of bin b2, the system marks bin b1_1 as illegal. The system is capable of performing this type of check and marking in response to the initial population of table 402.

During simulation, for every sampling call, the sample value is used to query into table 402 for a matching key value. For a matching key value, the system copies the sequences into list 404 as a "running sequence". The system is capable of continually spawning the sequences into list 404 and updating list 404 during the simulation. The process of continually spawning and updating sequences in list 404 is referred to as the DFA previously described herein.

FIG. 5 is a flow chart illustrating an example method 500 of operation for computing functional coverage for a design. The operations described in connection with FIG. 1 may be performed by a computer system (system). An example of a system capable of performing the operations of FIG. 5 is described in connection with FIG. 21. FIG. 5 may begin in a state where the system has performed the elaboration and population phases. Further, a simulation of a design corresponding to the elaborated testbench may have started or is executing.

In block 502, the system receives a sample value for an expression or a variable from the simulation. In block 504, the system is capable of determining which, if any, sequences are to be added to list 404 based on a comparison of the sample value received in block 502 with the key values of table 402. For example, the system is capable of querying table 402 to find a key value matching the received sample value and determining the sequence(s) for that matched key value. In block 506, the system is capable of adding the sequence(s) determined in block 504 to list 404.

In block 508, the system is capable of updating the running sequences in list 404 based on the sample value. In general, a "running sequence" refers to a sequence that has been added to list 404. Block 508 may include one or more different operations. In block 508, for example, the system is capable of determining the expected next state value of a running sequence based on the current state value, the type of transition to the next state, and the number of repetitions of the current state.

Certain other operations performed as part of block 508 are illustrated as blocks 510-518. For example, in block 510, the system is capable of discarding any sequence on list 404 that has an expected state that does not match the sample value. In the case of a mismatch, the system discards or removes the sequence from the list. In block 512, the system is capable of incrementing the hit count for any sequence on list 404 that reaches and end state. If the system determines that a sequence has reached the end state, the hit count for the bin containing the sequence is updated (e.g., incremented).

In block 514, the system is capable of issuing a runtime error in response to reaching an end state of an illegal sequence in list 404. The system issues runtime errors for detected illegal transitions. The system does not consider ignored transitions when determining overall coverage. In block 516, the system is capable of updating the default transition bin. In response to list 404 becoming empty at any instant during simulation without updating the hit count of any bin (other than the default bin), the system updates (e.g., increments) the user defined default transition bin. In block 518, the system is capable of advancing the sequence state for each sequence having a next state that matches the sample value and that has not reached the end state. If, for example, the expected state value matches the current sample value, the system advances the sequence to the next state.

FIGS. 6, 7, 8, 9, 10, and 11 illustrate certain operative features of using transition bins according to the inventive arrangements described within this disclosure. FIGS. 6-11 are described in the context where a system is simulating a design and a testbench for the design has been processed through the elaboration and population phases. For purposes of illustration, the testbench for the design used for FIGS. 6-11 is the testbench of Example 1. Each of FIGS. 6-11 illustrates the state of data structures such as bin hit counts 602 and list 404 after having received a particular sample value.

As previously described, each transition bin class object is capable of storing a hit count for the corresponding bin therein. For purposes of illustration, the bin hit counts are shown collectively as data structure 602. Further, the system is capable of storing next expected values in table form using table 604. In another aspect, the system is capable of determining the next state values without storing such values in table form as shown in FIGS. 6-11.

FIG. 6 illustrates the state of bin hit counts 602 and list 404 at the start of simulation. Further, in this example, the system receives a sample value of 1 during simulation. In response to receiving the sample value of 1, the system compares the sample value of 1 against the values in the key column of table 402. Since the sample value does not match any key values (e.g., 2, 4, or 3), the system does not add any sequences to list 404 as child sequences. For purpose of description, each sequence added to list 404 is referred to as a child sequence since each sequence may have more than one instance on list 404 at any given time. Further, each running sequence added to the list is considered a child of the transition bin containing that sequence.

Referring to FIG. 7, the system next receives a sample value of 4 during the simulation. In response to receiving the sample value of 4, the system matches the 4 to the key value of 4 in table 402. The system determines the sequences a_2, b_1, c_5, and c_6 each correspond to the key value 4 of table 402 and should be added to list 404. Accordingly, the system adds sequences a_2, b_1, c_5, and c_6 to list 404 as child sequences a_2_child_1, b_1_child_1, c_5_child_1, and c_6_child_1. Since list 404 did not include any other child sequences, there are no existing child sequences for which the system may check next expected values against the sample value.

Further, for each of the child sequences added to list 404, since the starting state 4 was the sample value, the system advances each of child sequences a_2_child_1, b_1_child_1, c_5_child_1, and c_6_child_1 to the next state. Further, the next expected value for each of a_2_child_1, b_1_child_1, c_5_child_1, and c_6_child_1 may be determined. For example, for the child sequence corresponding to sequence "a_2=(4=>5[*2])", since state 4 matches the sample value, the next expected value is 5.

Figure 8:
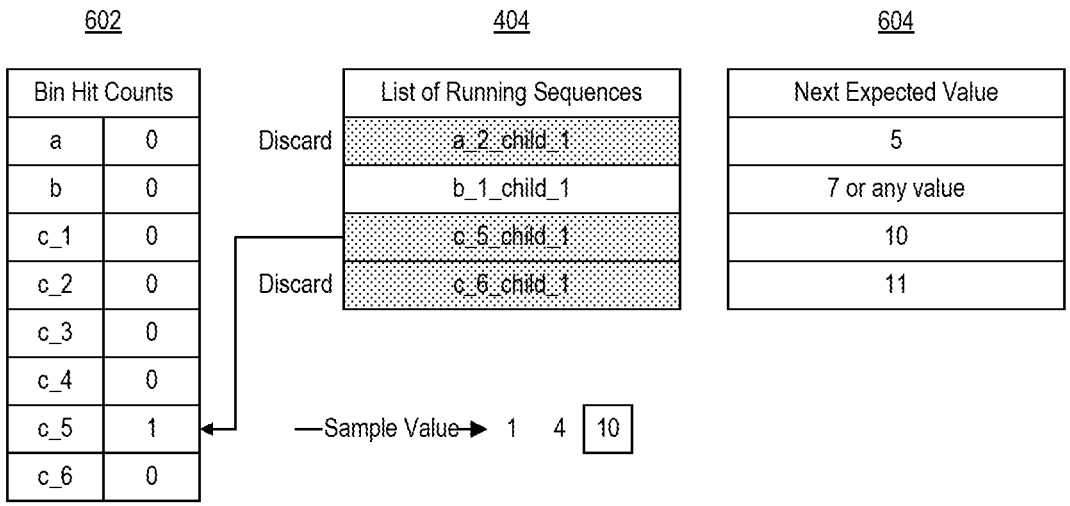

Referring to FIG. 8, the system next receives a sample value of 10 during simulation. In response to receiving the sample value of 10, the system determines that the sample value does not match any key value in table 402. As such, the system does not add, or spawn, any new child sequences to list 404. Since list 404 includes one or more child sequences, the system also must update the existing child sequences of list 404. The system compares the sample value with the next expected value for each existing child sequence on list 404. In the example of FIG. 8, since 10 does not match the next expected value of a_2_child_1 or of c_6_child_1, each is discarded or removed from list 404 (indicated with shading). Since the next expected value of c_5_child_1 matches the sample value, the system advances c_5_child_1 to the next state, which is the end state. Accordingly, the system increments the hit count corresponding to the parent sequence of c_5_child_1 (e.g., the hit count of c_5). Further, the system discards or removes c_5_child_1 from list 404. The system determines that since b_1_child_1 has a non-consecutive transition between state 4 and state 7, b_1_child_1 is kept on list 404 until a value of 7 is sampled.

Figure 9:
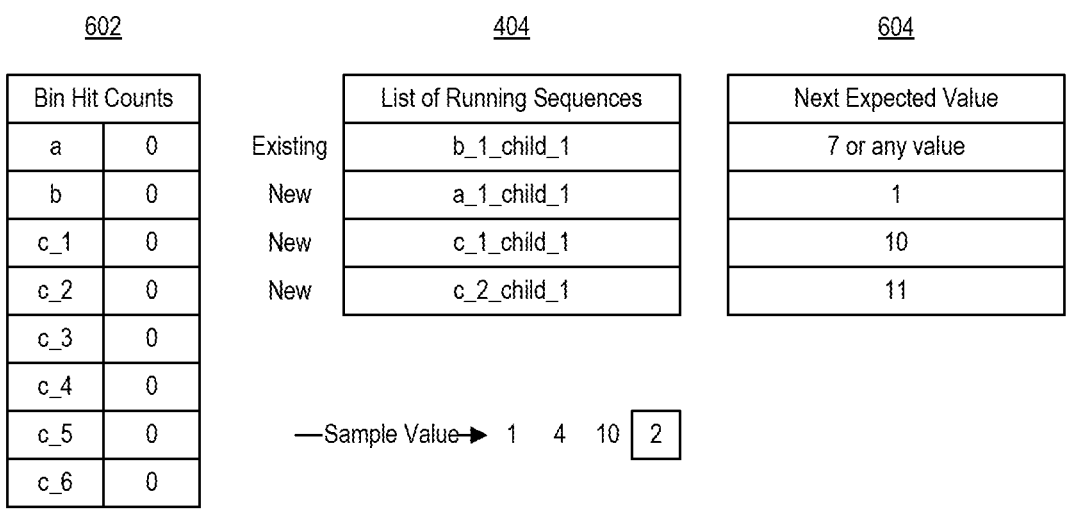

Referring to FIG. 9, the system next receives a sample value of 2 during the simulation. In response to receiving the sample value of 2, the system indexes into table 402 and matches the sample value to the key value 2. The system identifies sequences a_1, c_1, and c_2 and adds corresponding child sequences a__child_1, c_1_child_1, and c_2_child_1 to list 404. The system also determines the next expected value for each of the added child sequences. The system determines that since b_1_child_1 has a non-consecutive transition between state 4 and state 7, the system keeps b_1_child_1 on list 404 until a value of 7 is sampled.

Referring to FIG. 10, the system next receives a sample value of 7 during the simulation. In response to receiving the sample value of 7, the system indexes into table 402 and determines that the sample value does not match any key value. Accordingly, the system does not add any new child sequences to table 402. The system also compares the sample value with the next expected value for each existing child sequence in table 402. In the example of FIG. 10, since 7 does not match the next expected value of a_1_child_1, c_1_child_1, c_2_child_1, each child sequence is discarded or removed from list 404 (indicated with shading). Since the next expected value of b_1_child_1 matches the sample value, the system advances b_1_child_1 to the next state, which is 8.

Referring to FIG. 11, the system next receives a sample value of 8 during simulation. In response to receiving the sample value of 8, the system determines that the sample value does not match any key value in table 402. As such, the system does not add, or spawn, any new child sequences to list 404. Since list 404 includes one or more child sequences, the system also must update the existing child sequences of list 404. The system compares the sample value with the next expected value for each existing child sequence. In the example of FIG. 10, since the next expected value of b_1_child_1 matches the sample value, the system advances b_1_child_1 to the next state, which is the end state. Accordingly, the system increments the hit count corresponding to the parent sequence of b_1_child_1 (e.g., the hit count of b_1). Further, the system discards or removes b__child_1 from list 404.

As discussed the inventive arrangements described within this disclosure provide a computationally efficient approach for performing functional coverage using transition bins. In other conventional techniques such as one known as the "values list" technique, each sequence is expanded into a list of values which must be traversed in-order to consider the sequence as hit. Upon sampling a value, every sequence in a bin is updated. The values list technique allows only one sequence to be updated at a given time. As such, transition bins with multiple sequences become too complex to handle efficiently. In accordance with the inventive arrangements described herein, referred to as the "DFA" technique, the system is capable of spawning child sequences. The system may have multiple sequences and/or multiple instances of any given sequence running at any given instant. This ability is supported by using table 402 and creating copies of the parent sequence(s) as child sequences in list 404 as described.

Table 2 below illustrates the run times measured for different transition bin sizes corresponding to 3, 6, 9, 12, 15, 18 and 20 with a sample set size of 1 million for the DFA and values list techniques. Table 2 illustrates that the DFA technique provides between approximately a 1.7× to 2.5× improvement in runtime performance over the values technique. As noted, the values list technique queries and updates each sequence with the sample value. The improvement is performance achieved using the DFA technique is due, at least in part, by querying, spawning, and updating fewer sequences using table 402 as described. Updates for the DFA technique per sample can also equate to zero as running sequences can dynamically discard sequences with next expected values that do not match the sample value at any given instant.

TABLE 2

| Number of Transition Bins | Number of Sequences | Values List Technique Runtime (ns) $V_1$ | DFA Technique Runtime (ns) $D_1$ | Relative Gain $(V_1/D_1)$ |
|---|---|---|---|---|
| 3 | 12 | 521967000 (0.52 s) | 290006700 (0.29 s) | 1.799844624 |
| 6 | 24 | 962813200 | 436396800 | 2.206279239 |
| 9 | 36 | 1371644700 | 667607600 | 2.054567234 |
| 12 | 48 | 1879822600 | 717606600 | 2.619572618 |
| 15 | 60 | 2319050800 | 860815900 | 2.694014829 |
| 18 | 72 | 2763636000 | 1012810300 | 2.728680781 |
| 20 | 80 | 2968421900 (2.96 s) | 1085620500 (1.08 s) | 2.734308997 |

Similar improvements in runtime are obtained for sample sizes above 1 million with the improvements generally being more pronounced (e.g., larger) for larger sample sizes such as 10 million and 100 million.

FIG. 12 illustrates an example method 1200 of using a DFA technique with transition bins for performing functional coverage of a design during simulation. In block 1202, The operations described in connection with FIG. 12 may be performed by a computer system such as the computer described in connection with FIG. 21.

In block 1202, for a covergroup corresponding to a variable in a design, the system is capable of generating a state coverage data structure specifying a plurality of transition bins. Each transition bin includes a sequence. Each sequence specifies states of the variable to be traversed in order during simulation of the design. In one aspect, generating the state coverage data structure includes including a hit count for each transition bin. Generating the state coverage data structure and the state sequence table may be performed during an enumeration phase for the covergroup.

In block 1204, the system is capable of generating a state sequence table configured to use state values as keys and one or more of the sequences as data for the respective keys. The system is further capable of populating the state sequence table in response to starting the simulation of the design.

In block 1206, the system is capable of, during simulation of the design, maintaining a sequence list specifying each sequence that is running based on sample values of the variable. In one aspect, the system is capable of maintaining the sequence list by, at least in part, in response to receiving a sample value of the variable, comparing the sample value with next states of the sequences and updating the state sequence table by adding a sequence determined to be running based on the comparing. In another aspect, the system is capable of maintaining the sequence list by, at least in part, in response to receiving a sample value of the variable, comparing the sample value with a next state of a selected sequence included in the sequence list and updating the state sequence table by keeping the selected sequence on the sequence list or removing the sequence from the sequence list based on the comparing.

In block 1208, the system is capable of updating hit counts for the transition bins during the simulation. The system is capable of updating the hit counts for the transition bins during the simulation by updating the hit count for each sequence that is legal, running, and that reaches an end state of the sequence. Legal sequences are sequences as illustrated in Table 1 excluding illegal, ignore, and default. The hit count for a default bin may be updated as previously described (e.g., in response to list 404 becoming empty at any instant during simulation without updating the hit count of any legal bin).

Example 3 is an HDL file specified in SystemVerilog and illustrates example syntax for defining a covergroup, coverpoints, and cross coverpoints.

Example 3

```
reg[3:0] b1;
covergroup cg;
    cp1 : coverpoint b1;
    cp2 : coverpoint b1;
        bins b1 [ ] = {1, 2, 3, 4, 7, 8};
    cp1xcp2: cross cp1, cp2 {
        bin crb3=binsof(cp1);
    }
endgroup
cg cg_inst1 = new( );
Cg cg_inst2 = new( );
```

In Example 3, a 4 bit register b1 is defined along with a covergroup named cg. Example 3 defines two instances named cg_inst1 and cg_inst2 of the covergroup cg. Covergroup cg includes coverpoints cp1 and cp2 and a cross coverpoint cp1xcp2. The coverpoint cp1 corresponding to b1 is capable of monitoring 16 states (16 states possible states of b1 being 4-bits). The coverpoint cp2 is capable of monitoring 6 states (e.g., 1, 2, 3, 4, 7, and 8). The cross coverpoint of cp1xcp2 is capable of monitoring 96 states (e.g., 16×6 states). It should be appreciated that a cross coverpoint may include coverpoints as illustrated in Example 3, and/or also may include one or more cross coverpoints.

Figure 13:
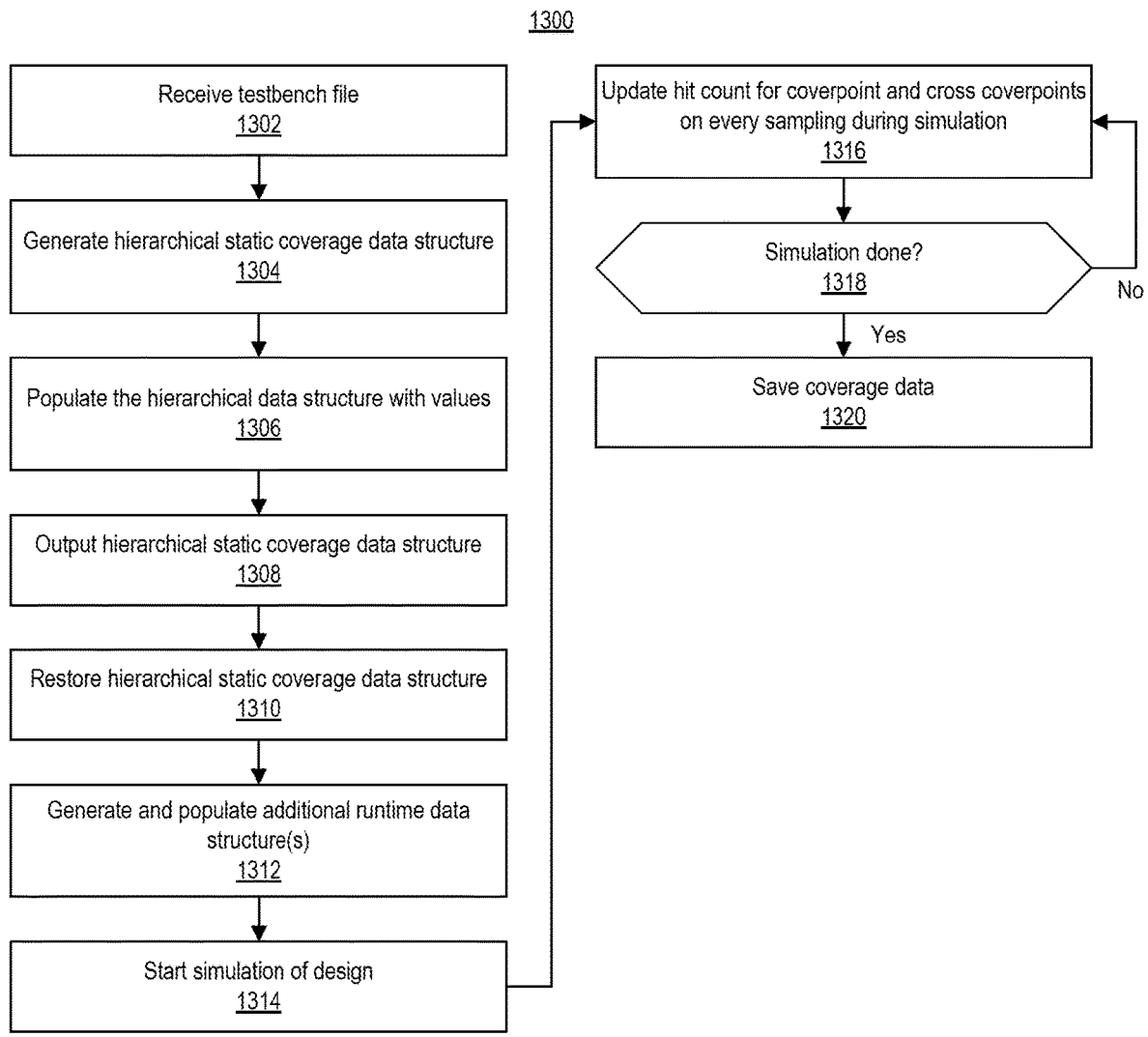
FIG. 13 illustrates an example method of implementing coverpoints and cross coverpoints for performing functional coverage of a design.

FIG. 13 illustrates an example method 1300 of implementing coverpoints and cross coverpoints for performing functional coverage of a design. The operations described in connection with FIG. 13 may be performed by a computer system (system). An example of a system capable of performing the operations of FIG. 13 is described in connection with FIG. 21. In general, method 1300 is performed in three different phases including elaboration, population, and runtime. Beginning in block 1302, the system receives a testbench file. An example of a testbench file is the HDL file of Example 3. The testbench file may be specified in SystemVerilog and define one or more covergroups. Each covergroup may include one or more coverpoints and one or more cross coverpoints.

Figure 14:
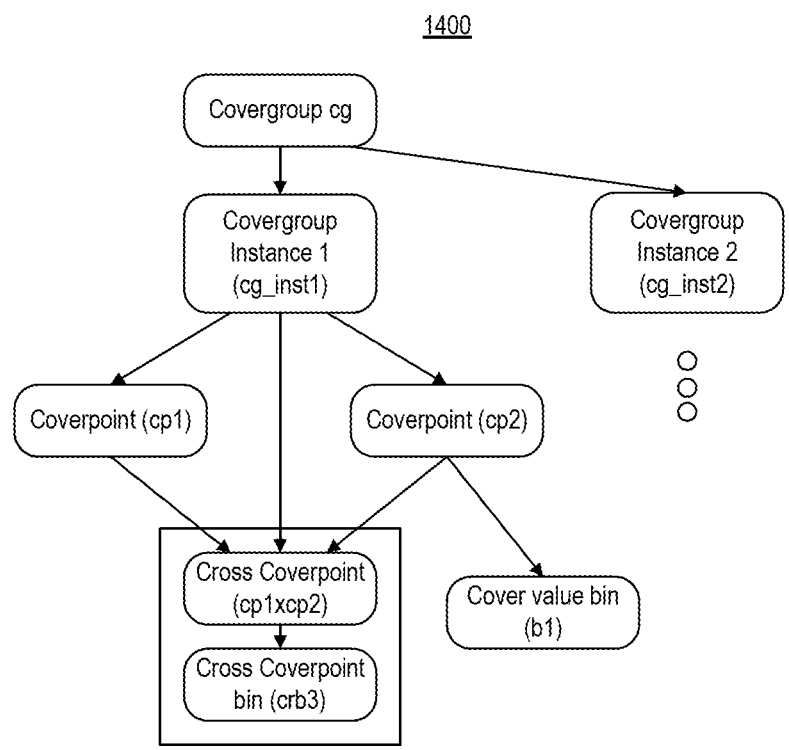
FIG. 14 illustrates another example of a static coverage data structure.

Blocks 1304-1308 may be performed as part of the elaboration phase of method 1300. In block 1304, the system is capable of generating a static coverage data structure. The static coverage data structure may be hierarchical. As an example, the system is capable of generating a static coverage data structure for the covergroup cg defined in the testbench file. The data structure includes bins. Whereas the transition bins described previously within this disclosure stored a sequence, the bins in the example of FIG. 13 store values. An example static coverage data structure generated for the testbench of example 3 is shown in FIG. 14.

In an example implementation, during elaboration, a covergroup is internally modelled as a class SystemVerilog class where each variable and/or instance of the covergroup type is elaborated as an object of the class. Each class representation of a covergroup has a constructor subprogram responsible for initializing the object (e.g., an instance of the covergroup class) and an update subprogram that updates hit counts of the coverpoints and the cross coverpoints upon sampling during simulation.

In block 1306, the system is capable of populating the static coverage data structure with values corresponding to the coverpoints and the cross coverpoint(s). In block 1308, the system is capable of outputting the resulting static coverage data structure. For example, the system is capable of outputting the populated static coverage data structure as a binary file. The static coverage data structure may be stored in a non-volatile memory of the system. In an example implementation, the system is capable of outputting the resulting static coverage data structure as a C++ database.

Blocks 1310-1312 may be performed as part of the population phase of method 1300. In block 1310, the system is capable of loading the static coverage data structure from non-volatile memory into runtime memory (e.g., volatile memory or RAM). In block 1312, the system is capable of generating and populating one or more runtime data structures. For example, the system is capable of generating data structures corresponding to a coverpoint hit count and a cross coverpoint hit count.

Blocks 1314-1320 may be performed as part of the runtime phase of method 1300. In block 1314, the system is capable of starting simulation of the design. In block 1316, the system is capable of updating the hit count for the coverpoint(s) and the cross coverpoint(s) as sample values are received during simulation. The system is capable of updating the hit counts in response to each sampling performed during simulation. For example, during the simulation, the system is capable of sampling update event data (e.g., sampling events corresponding to the update subprogram and based on the sampling functions) and updating the runtime data structures corresponding to the hit count for the coverpoint(s) and the hit count for the cross coverpoint(s).

In block 1318, a determination is made as to whether the simulation is done. In response to determining that the simulation is not done, method 1300 loops back to block 1316 to continue. In response to determining that the simulation is done, method 1300 proceeds to block 1320. In block 1320, the system stores the coverage data that is generated. The coverage data, e.g., the hit counts, may be stored in non-volatile memory.

FIG. 14 illustrates an example of a static coverage data structure (hereafter "data structure) 1400. The system may generate data structure 1400 for a covergroup during the elaboration phase described in connection with FIG. 13. For the testbench of Example 3, FIG. 14 illustrates an example C++ class hierarchy that may be generated and stored. The example of FIG. 14 has two instances named cg_inst1 and cg_inst2 of the covergroup cg, having coverpoints cp1 and cp2 and a cross coverpoint cp1xcp2.

In accordance with the inventive arrangements described herein, coverpoints and cross coverpoints may be tracked during simulation using a technique referred to as "recursive". The recursive technique provides various advantages over other conventional techniques. As an illustrative example, one conventional technique is referred to as "iterative". In the iterative technique, the coverpoints and cross coverpoints are modeled in a multi-dimensional data structure that allows both population and query of individual components. The iterative technique suffers from various drawbacks such as, for example, lack of memory locality and significant memory allocation and deallocation overhead during runtime.

By comparison, for the recursive technique, for multiple components defined in a cross point specification at any time, cross product hit counts are calculated only for two components. The results are recursively crossed for any number of components that follow. The recursive technique provides improved memory locality compared to the iterative technique. Further, the recursive technique provides less memory allocation and deallocation overhead compared to multidimensional data fetches in the case of the iterative technique.

In the recursive technique, for multiple components defined in a cross coverpoint specification, the system, at any time, calculates the cross product hit counts only for two components. The system is capable of recursively crossing the results for any number of components that follow.

Figure 15:
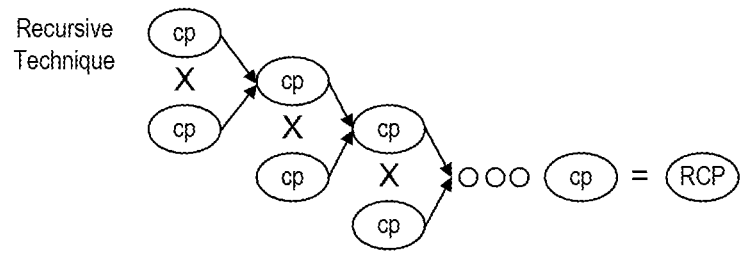
FIG. 15 illustrates distinctions between a conventional iterative technique for tracking coverpoints and cross coverpoints and a recursive technique for tracking coverpoints and cross coverpoints in accordance with the inventive arrangements disclosed herein.

FIG. 15 illustrates distinctions between the conventional iterative technique for tracking coverpoints and cross coverpoints and the recursive technique for tracking coverpoints and cross coverpoints in accordance with the inventive arrangements disclosed herein. Within FIG. 15, the term "cp" refers to a cross coverpoint or a coverpoint. The term "RCP" refers to a resultant cross coverpoint. In the recursive approach, any given cross coverpoint that is calculated by the system involves only two base cross pointers at any given time. By comparison, the iterative approach considers all possible components together and, as such, typically includes more than two base cross pointers. A "base cross pointer" refers to a coverpoint or a cross coverpoint. The system models each internal cross as a cross coverpoint with two base cross pointers. Every internal cross is properly monitored or sampled along the component coverpoint or the cross coverpoint.

For purposes of illustration, consider the case where the system monitors the cross coverpoint axbxc. This cross coverpoint may be defined as axbxc: cross axb,c. In this example, axbxc internally has 2 base cross pointers. One base cross pointer corresponds to axb and the other base cross pointer corresponds to c. Further, axb is defined as a separate user defined cross such as axb: a, b.

In another example, the system may also define axbxc as axbxc: cross a,b,c. In this case, axbxc internally as 2 base cross pointers. One base cross pointer corresponds to axb (created internally) and the other base cross pointer corresponds to c. The internally defined cross axb also has 2 base cross pointers corresponding to a and b, respectively.

Hit indexes are the indexes, e.g., runtime data structures, that may be implemented as a contiguous hit count array in a coverpoint or a cross coverpoint that gets updated on each sampling event. In the example implementations described herein, cross coverpoints use hit indexes instead of actual value states or the transitions mentioned in their expressions. As and when coverpoints and/or cross coverpoints are marked covered in the indexes of their respective flat hit count arrays during sampling, the hit indexes for the current sampling of the respective coverpoints and/or cross coverpoints are computed and stored into the runtime data structures of coverpoints and cross coverpoints. The cross coverpoint which crosses such a coverpoint or a cross coverpoint is then marked covered in its flat hit count array, at index, which is calculated from the current hit indexes of the constituent coverpoints and/or cross coverpoints defined in the expression.

In one aspect, cross operation hit indexes are calculated using the expression:

Cross Hit Index=(Internal cross1 hit index*size of internal cross2)+(Internal cross2 hit index)

To use the same cross in other cross expressions, the current hit indexes may be stored for subsequent use.

Example 4 illustrates another testbench defining an example covergroup with coverpoint a monitoring an expression with 4 states, coverpoint b monitoring an expression with 3 states, and coverpoint c monitoring an expression with 3 states. Cross axbxc, which represents all combinatorial states of coverpoints a, b and c, monitors 36 cross states.

Example 4

```
reg[3:0] b1, b2, b3
covergroup cg;
    a: coverpoint b1 {bins bi1={1, 3, 5, 7}; }
    b: coverpoint b2 {bins bi1={3, 5, 8}; }
    c: coverpoint b3 {bins bi1={5, 7, 9}; }
    axbxc: cross a, b, c;
endgroup
cg cg_inst=new( );
initial begin
    #1 b1=1; b2=3; b3=5; cg.sample( );
    #1 b1=5; b2=5; b3=7; cg.sample( );
    #1 b1=7; b2=8; b3=9; cg.sample( );
end
```

Figure 16:
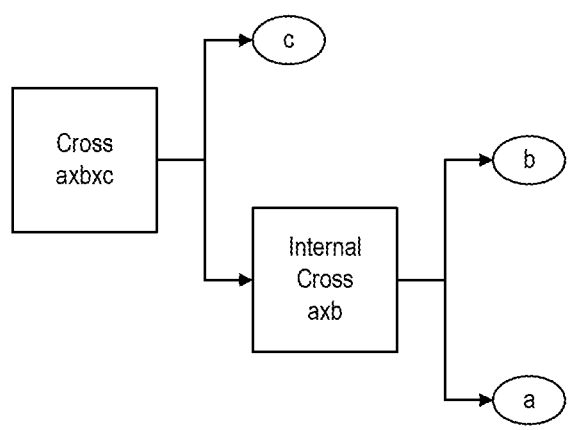
FIG. 16 illustrates an example of internal modeling of a cross of three coverpoints.

Referring to Example 4, the cross axbxc is a cross of three coverpoints a, b, and c and is internally modelled as shown in FIG. 16. Modeling the crosses as shown in FIG. 16 facilitates implementation of the recursive technique during simulation. Internally, the cross axbxc has two cross base pointers including an internal cross axb and a coverpoint c.

Figure 17:
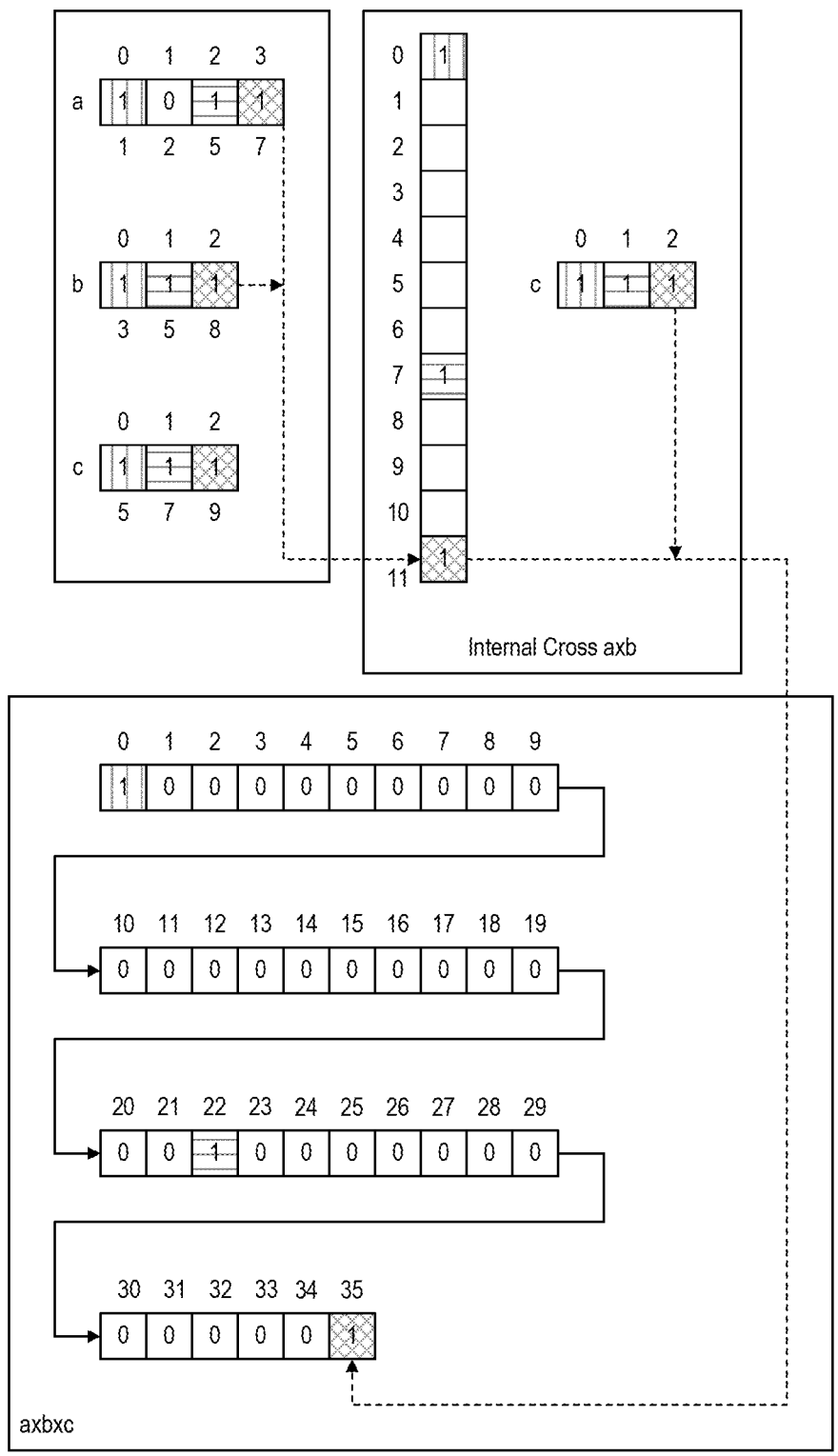
FIG. 17 illustrates an example cross operation for a cross of three coverpoints using a recursive technique.

FIG. 17 illustrates an example cross operation for the cross axbxc using the recursive technique. In the example of FIG. 17, the system stores the coverpoint hit indexes of a, b and c at any delta time. The system further calculates the internal cross hit indexes recursively until the final cross is reached. In the example of FIG. 17, internal cross 1 is axb and the internal cross 2 is c. The hit index for the internal cross axb corresponding to block 1702 is calculated using the expression (a hit index*size of b)+(b hit index). The hit index for the cross axbxc corresponding to block 1704 is calculated using the expression (Internal cross axb hit index*size of c)+(c hit index).

Figures 18, 19:
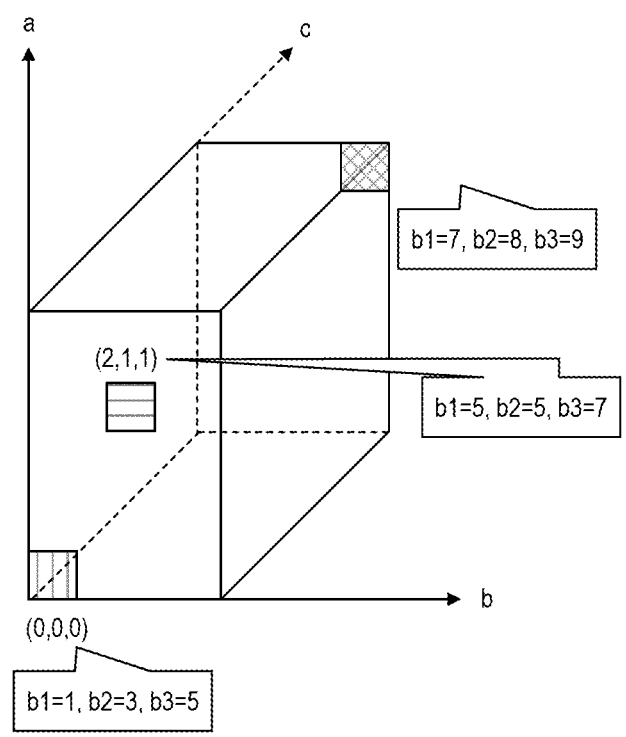
FIG. 18 illustrates a table showing example calculations performed by the system to determine an internal cross hit index and a cross coverpoint hit index.
FIG. 19 illustrates an example data structure for a hit count array for a cross of multiple crosspoints using a conventional iterative technique.

FIG. 18 illustrates a table showing the example calculations performed by the system to determine the internal cross axb and the cross axbxc hit indexes. Based on FIGS. 17 and 18, cross axbxc is marked as covered at hit indexes 0, 22 and 35. The system is capable of updating the coverage database based on the results.

FIG. 19 illustrates an example data structure for a hit count array for the cross axbxc using the iterative technique. As shown, the data structure for FIG. 19 is a multi-dimensional array. More particularly, the example of FIG. 19 illustrates a 3-dimensional hit count array data structure. When a cross has "n" expressions, the resulting data structure for the iterative technique is an "n" dimensional array. This type of implementation results in a varying number of base pointers in crosses (e.g., n different base pointers) with a varying number of expressions crossed. FIG. 19 illustrates the memory that may be allocated during a dynamic memory management process to implement the multi-dimensional hit count array shown. Acquiring contiguous memory to implement such a multi-dimensional array, however, can be difficult. Such memory may not be available during runtime (e.g., during simulation). In cases where the multi-dimensional array is not contiguous, caching becomes more difficult and may have an adverse impact on performance of the system at runtime (e.g., result in slower simulation). The impact on performance may increase with the number of dimensions of the array.

By comparison, the recursive technique described within this disclosure results in a one-dimensional hit count array data structure. In the case of a 3 coverpoint expression, for example, the hit count array is sized at 36. As such, n-expressions in cross may use a one-dimensional hit count array data structure. The resultant cross has only two base pointers and hence the cross data structure remains the same for all crosses. For all internal crosses, the system saves only the hit indexes thereby avoiding the need to create a hit count array. For dynamic memory management, a one dimensional array is more likely to be allocated as one large chunk of contiguous memory. As discussed, use of contiguous memory results in improved memory locality compared to the iterative technique, improved caching performance, and improved runtime (e.g., faster simulation).

Use of the recursive technique described herein for maintaining and/or tracking of coverpoints and cross coverpoints can lead to approximately a 2× to 5.6× factor improvement in runtime performance over the iterative technique during simulation. The performance benefit achieved using the recursive technique tends to increase over the iterative technique as number of coverpoints/crosses defined in a cross (or) the number of states defined in a coverpoint in a cross increases. As noted the increase in performance is due, at least in part, to the improved memory locality and reduced memory allocation/deallocation overhead of the recursive technique compared to the iterative technique.

FIG. 20 illustrates an example method 2000 of using a recursive technique for performing functional coverage of a design during simulation. The operations described in connection with FIG. 20 may be performed by a computer system such as the computer described in connection with FIG. 21 to track coverpoints and/or cross coverpoints during simulation.

In block 2002, the system, for a covergroup of a design, is capable of generating a static coverage data structure. The covergroup may include one or more coverpoints and one or more cross coverpoints. The static coverage data structure can include a bin corresponding to each coverpoint and a bin corresponding to each cross coverpoint. The system is capable of populating values for each coverpoint and/or cross coverpoint within the respective bins. Thus, each bin includes values for the corresponding coverpoint and/or cross coverpoint as the case may be.

In block 2004, the system is capable of generating a hit index data structure for the cross coverpoint as a one dimensional array during the simulation. In block 2006, the system is capable of maintaining the hit index data structure for the cross coverpoint. In one aspect, for example, the system is capable of generating an internal cross data structure having a first base cross pointer and a second base cross pointer. Each of the base cross pointers may be represented by a coverpoint or a cross coverpoint. The system is capable of storing the coverpoint hit indexes for the coverpoints at any delta time during the simulation. The system further is capable of determining the internal cross hit indexes recursively until the final cross is reached and updating the hit index data structure for the cross coverpoint.

While FIG. 20 is described independently of FIG. 12, it should be appreciated that FIG. 12 and FIG. 20 may be performed concurrently or combined such that a simulator utilizes both the transition bin techniques described in connection with FIG. 12 and the recursive technique described in connection with FIG. 20. For example, subsequent to performing FIG. 12, the system may also perform one or more operations such as maintaining a hit index data structure for the cross coverpoint as a one-dimensional array during simulation. Further, in maintaining the hit index data structure as a one-dimensional array, the system may perform operations such as generating an internal cross data structure having a first base cross pointer and a second base cross pointer. Each of the base cross pointers may be represented by a coverpoint or a cross coverpoint.

Figure 21:
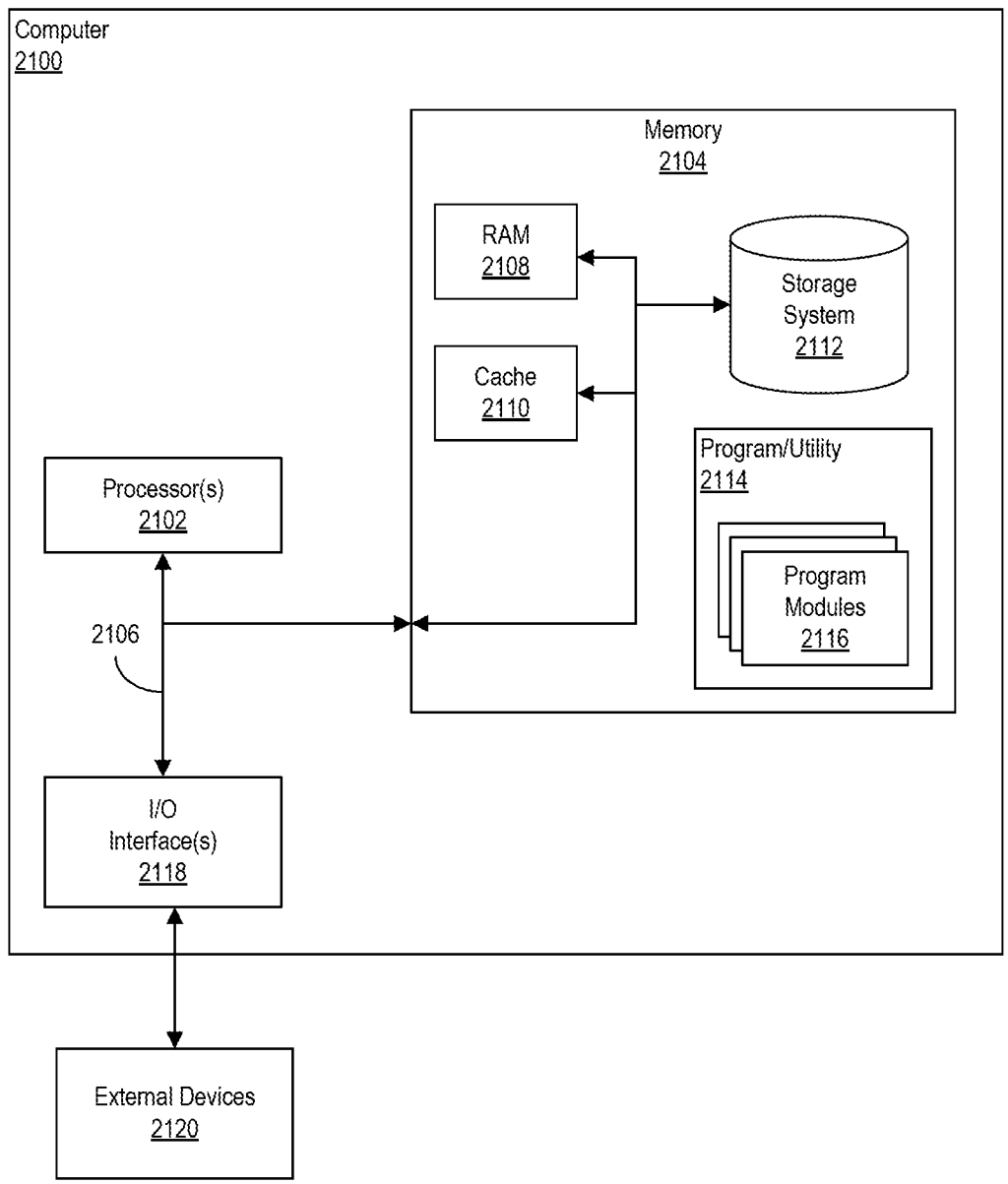
FIG. 21 illustrates an example computer for use with the inventive arrangements described within this disclosure.

FIG. 21 illustrates an example computer 2100 for use with the inventive arrangements described within this disclosure. Computer 2100 can include one or more processors 2102 (e.g., central processing units), a memory 2104, and a bus 2106 that couples various system components including memory 2104 to processor(s) 2102. Processor(s) 2102 may include any of a variety of processors that are capable of executing program code. Example processor types include, but are not limited to, processors having an x86 type of architecture (IA-32, IA-64, etc.), Power Architecture, ARM processors, and the like.

Bus 2106 represents one or more of any of several types of communication bus structures, including a memory bus or memory controller, a peripheral bus, an accelerated graphics port, and a processor or local bus using any of a variety of available bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer 2100 typically includes a variety of computer readable media. Such media may be any available media that is accessible by computer 2100 and may include any combination of volatile media, non-volatile media, removable media, and/or non-removable media.

Memory 2104 may include computer readable media in the form of volatile memory, such as random-access memory (RAM) 2108 and/or cache memory 2110. Computer 2100 may also include other removable/non-removable, volatile/non-volatile computer system storage media. By way of example, storage system 2112 may be provided for reading from and writing to a non-removable, non-volatile magnetic media and/or solid state drive (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each may be connected to bus 2106 by one or more data media interfaces. As will be further depicted and described below, memory 2104 may include at least one computer program product having a set (e.g., at least one) of program modules (e.g., program code) that are configured to carry out the functions and/or operations described within this disclosure.

For example, program/utility 2114, having a set (at least one) of program modules 2116 which may include, but are not limited to, an operating system, one or more application programs (e.g., user applications), other program modules, and/or program data, is stored in memory 2104. Program modules 2116 generally carry out the functions and/or methodologies as described herein at least with respect to operations performed by computer 2100. For example, program modules 2116 may implement a simulator capable of performing the operations described herein relating to simulating a design, executing a testbench for the design for purposes of simulation, and performing functional coverage for the design with respect to the testbench.

Program/utility 2114 is executable by processor(s) 2102. Program/utility 2114 and any data items used, generated, and/or operated upon by processor(s) 2102 are functional data structures that impart functionality when employed by processor(s) 2102. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer 2100 may include one or more Input/Output (I/O) interfaces 2118 communicatively linked to bus 2106. In one aspect, I/O interface(s) 2118 may include hardware controllers that allow computer 2100 to communicate with external devices 2120 where external devices 2120 allow a user to interact with computer 2100. For example, in that case, external devices may include a keyboard, a mouse, and/or a display. In other cases, I/O interfaces 128 may include, but are not limited to, network cards, modems, network adapters, etc. that allow computer 2100 to communicate with one or more other systems.

FIG. 21 is not intended to suggest any limitation as to the scope of use or functionality of the examples described herein. Computer 2100 is an example of computer hardware (e.g., a system) that is capable of performing the various operations described within this disclosure. Computer 2100 can be practiced as a standalone device, as a bare metal server, in a cluster, or in a distributed cloud computing environment. In a distributed cloud computing environment, tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service. Other examples of cloud computing models are described in the National Institute of Standards and Technology (NIST) and, more particularly, the Information Technology Laboratory of NIST.

Computer 2100 may be operational with numerous other general-purpose or special-purpose computing system environments or configurations.

Examples of computing systems, environments, and/or configurations that may be suitable for use with computer 2100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "processor" means at least one circuit capable of carrying out instructions contained in program code. The circuit may be an integrated circuit or embedded in an integrated circuit.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
    for a covergroup corresponding to a variable in a design, generating a static coverage data structure specifying a plurality of transition bins, wherein each transition bin includes a sequence, and wherein each sequence specifies states of the variable to be traversed in order during simulation of the design;
    generating a state sequence table configured to use state values as keys and one or more of the sequences as data for the respective keys;
    during simulation of the design, maintaining a sequence list specifying each sequence that is running based on sample values of the variable; and
    updating hit counts for the transition bins during the simulation.

2. The method of claim 1, wherein the generating the static coverage data structure comprises including a hit count for each transition bin.

3. The method of claim 1, wherein the generating the static coverage data structure and the state sequence table are performed during an enumeration phase for the covergroup.

4. The method of claim 3, further comprising:
    populating the state sequence table in response to starting the simulation of the design.

5. The method of claim 1, wherein the maintaining the sequence list comprises:
    in response to receiving a sample value of the variable, comparing the sample value with states of the sequences and updating the state sequence table by adding a sequence determined to be running based on the comparing.

6. The method of claim 1, wherein the maintaining the sequence list comprises:
    in response to receiving a sample value of the variable, comparing the sample value with a next state of a selected sequence included in the sequence list and updating the state sequence table by keeping the selected sequence on the sequence list or removing the sequence from the sequence list based on the comparing.

7. The method of claim 1, wherein the updating hit counts for the transition bins during the simulation comprises:
updating the hit count for each sequence that is legal, running, and that reaches an end state of the sequence.

8. The method of claim 1, wherein the covergroup includes a cross coverpoint, the method further comprising:
maintaining a hit index data structure for the cross coverpoint as a one-dimensional array during simulation.

9. The method of claim 8, wherein the maintaining the hit index data structure comprises:
generating an internal cross data structure having a first base cross pointer and a second base cross pointer, wherein each of the first base cross pointer and the second base cross pointer is represented by a coverpoint or a cross coverpoint.

10. A system, comprising:
a processor configured to initiate operations including:
for a covergroup corresponding to a variable, generating a static coverage data structure specifying a plurality of transition bins, wherein each transition bin includes a sequence, and wherein each sequence specifies states of the variable to be traversed in order during simulation of a design including the variable,
generating a state sequence table configured to use state values as keys and one or more of the sequences as data for the respective keys;
during simulation of the design, maintaining a sequence list specifying each sequence that is running based on sample values of the variable; and
updating hit counts for the transition bins during the simulation.

11. The system of claim 10, wherein the generating the static coverage data structure comprises including a hit count for each transition bin.

12. The system of claim 10, wherein the generating the static coverage data structure and the state sequence table are performed during an enumeration phase for the covergroup.

13. The system of claim 12, wherein the processor is configured to initiate operations further comprising:
populating the state sequence table in response to starting the simulation of the design.

14. The system of claim 10, wherein the maintaining the sequence list comprises:
in response to receiving a sample value of the variable, comparing the sample value with states of the sequences and updating the state sequence table by adding a sequence determined to be running based on the comparing.

15. The system of claim 10, wherein the maintaining the sequence list comprises:
in response to receiving a sample value of the variable, comparing the sample value with a next state of a selected sequence included in the sequence list and updating the state sequence table by keeping the selected sequence on the sequence list or removing the sequence from the sequence list based on the comparing.

16. The system of claim 10, wherein the updating hit counts for the transition bins during the simulation comprises:
updating the hit count for each sequence that is legal, running, and that reaches an end state of the sequence.

17. The system of claim 10, wherein the covergroup includes a cross coverpoint, and wherein the processor is configured to initiate operations further comprising:
maintaining a hit index data structure for the cross coverpoint as a one-dimensional array during simulation.

18. The system of claim 17, wherein the maintaining the hit index data structure comprises:
generating an internal cross data structure having a first base cross pointer and a second base cross pointer, wherein each of the first base cross pointer and the second base cross pointer is represented by a coverpoint or a cross coverpoint.

19. A computer program product, comprising:
one or more non-transitory computer readable storage media, and program instructions collectively stored on the one or more computer readable storage media, wherein the program instructions are executable by computer hardware to initiate operations including:
for a covergroup corresponding to a variable, generating a state coverage data structure specifying a plurality of transition bins, wherein each transition bin includes a sequence, and wherein each sequence specifies states of the variable to be traversed in order during simulation of a design including the variable;
generating a state sequence table configured to use state values as keys and one or more of the sequences as data for the respective keys;
during simulation of the design, maintaining a sequence list specifying each sequence that is running based on sample values of the variable; and
updating hit counts for the transition bins during the simulation.

20. The computer program product of claim 19, wherein the covergroup includes a cross coverpoint, and wherein the program instructions are executable by the computer hardware to initiate operations including:
maintaining a hit index data structure for the cross coverpoint as a one-dimensional array during simulation.

* * * * *